United States Patent Office 3,321,201
Patented May 23, 1967

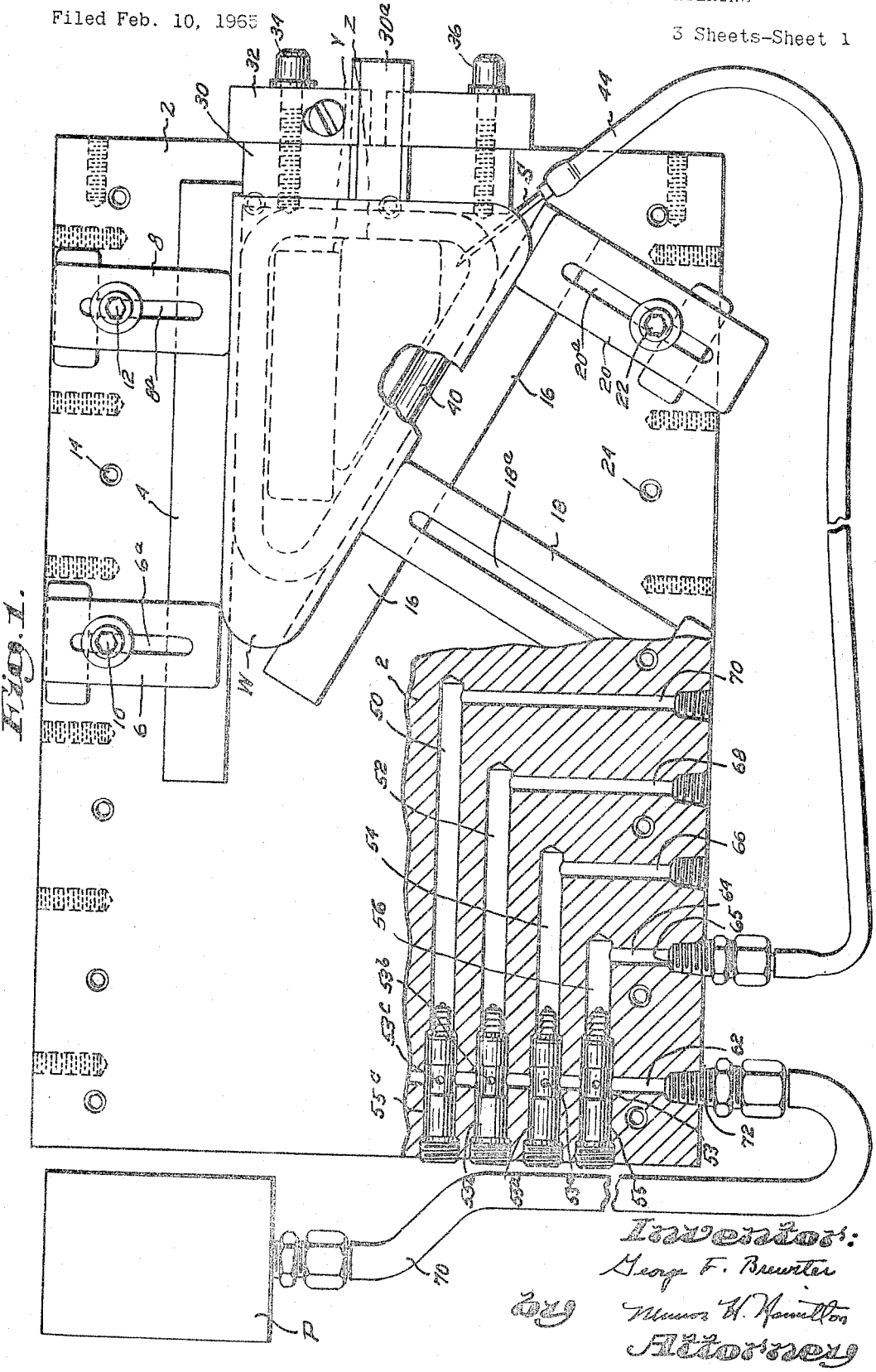

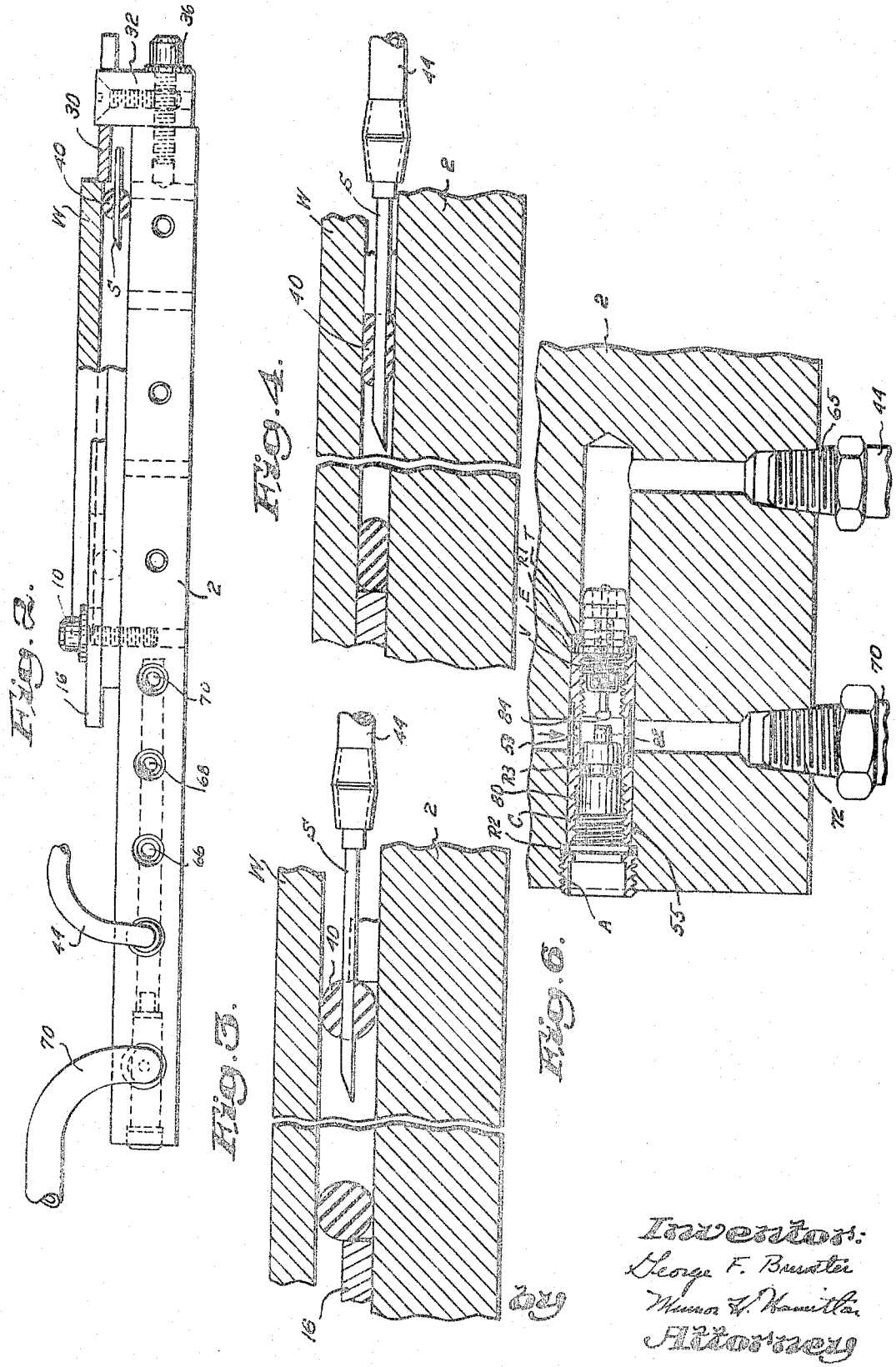

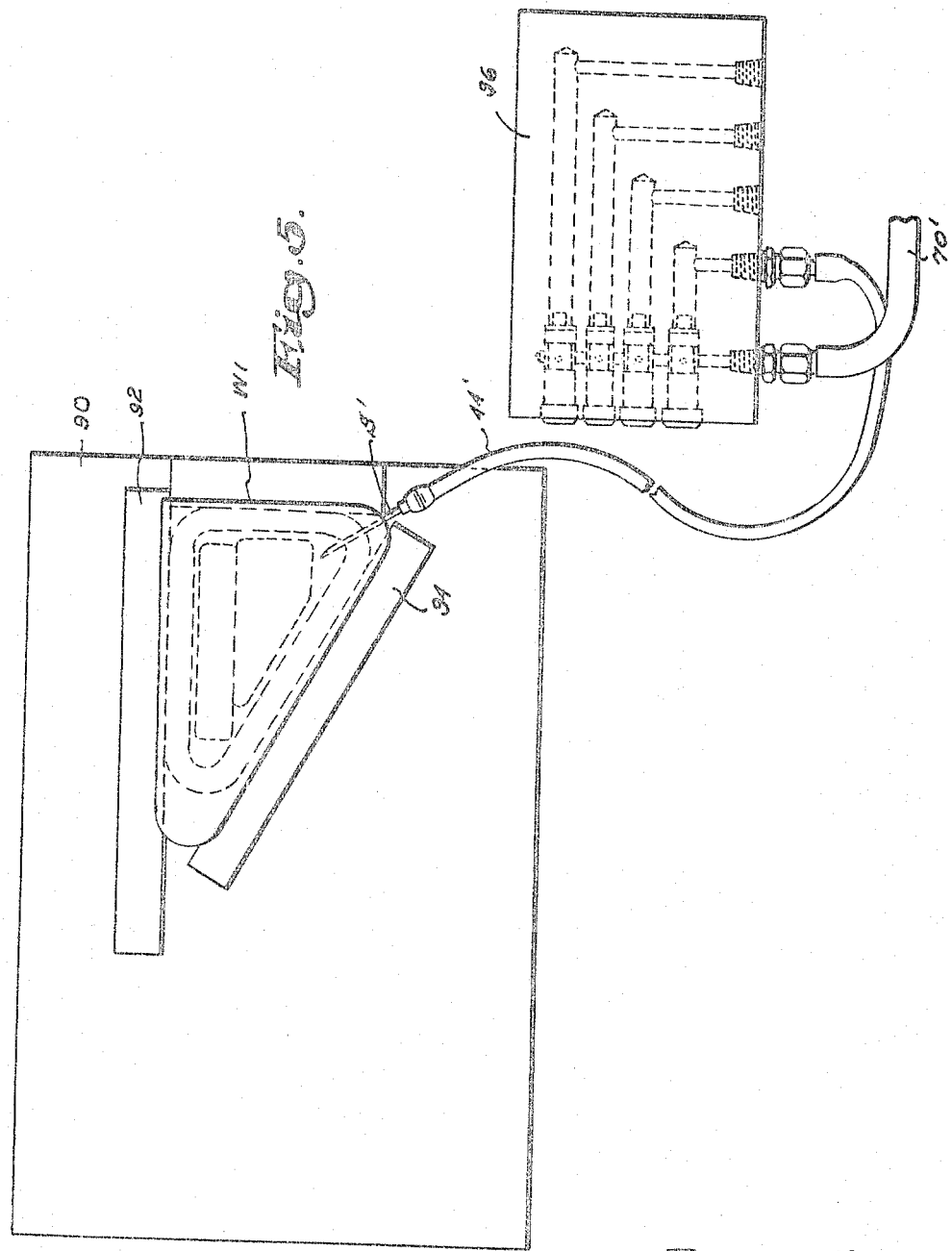

3,321,201
VACUUM CHUCK MEANS AND METHOD OF
HOLDING MATERIAL
George F. Brewster, 30 Rogers Road,
Kittery, Maine 03904
Filed Feb. 10, 1965, Ser. No. 431,652
6 Claims. (Cl. 269—21)

This invention relates to an improved work-holding chuck arrangement of the vacuum operated type for use in securing workpieces which are required to be held, for example, in connection with machining operations or for other reasons.

A vacuum chuck of one common type has been disclosed in United States Patent No. 2,730,370 issued to me under date of Jan. 10, 1956. The type of vacuum chuck disclosed in this patent is generally representative of various forms of vacuum chucks which operate on the principle of evacuating air through air ducts formed in a base member on which a workpiece is to be supported. Although suitable for some purposes these chuck members involve the use of sealing rings which must be carefully seated in some form of sealing ring groove and they are, in some cases at least, of limited utility when dealing with rough or irregular shaped workpieces. Another common form of chuck is the well-known magnetic type chuck which is capable of holding workpieces of irregular shapes, but is only operable with a ferrous metal type workpiece which is capable of being held by magnetic forces.

It is, in general, a chief object of the present invention to provide improved methods and apparatus for holding workpieces by vacuum to carry out machine tool operations and other objectives as generally noted above.

Another object of the invention is to devise a vacuum chuck apparatus in which evacuation of air through a workpiece supporting base is eliminated and an improved sealing ring arrangement, together with a novel control valve means is utilized for creating a desired vacuum.

Still another object of the invention is to provide a vacuum chuck arrangement which is of increased versatility and especially adapted to hold workpieces of various irregular shapes and size, as well as workpieces having very rough surfaces.

Still a further object is to devise a vacuum chuck arrangement which can be combined with a magnetic type chuck base to enable the magnetic type chuck to be usable in holding either magnetizable or non-magnetizable materials.

The nature of the invention and its other objects and novel features will be more fully understood and appreciated from the following description of a preferred embodiment of the invention selected for purposes of illustration and shown in the accompanying drawings in which:

FIGURE 1 is a plan view showing the vacuum chuck apparatus of the invention in an operative position;

FIGURE 2 is a side elevational view of the apparatus;

FIGURE 3 is a detail fragmentary cross sectional view indicating a step in positioning a workpiece on the chuck;

FIGURE 4 is another detail fragmentary cross sectional view showing the same structure as that shown in FIGURE 3 but with vacuum having been applied and atmospheric forces exerted on the workpiece;

FIGURE 5 is a plan view showing a modified form of chuck member; and

FIGURE 6 is a detail cross sectional plan view of a special valve control mechanism in the chuck member.

My improved method for vacuum holding a workpiece is based on the concept of supporting the workpiece in a raised position with respect to a base member and evacuating air from the space between the workpiece and the base in a novel manner. The method is carried out by locating on a suitable base specially designed spacing block means of uniform thickness and arranged so as to define an enclosure whose shape generally corresponds to and is slightly smaller than the shape of the workpiece to be held. I also mount on the base within the enclosure thus defined, and projecting above the upper surface of the spacing block means, an endless elastomeric ring body which is of a size chosen to fit the enclosure and to lie in abutting relationship within the enclosure. Adjustable clamping abutments are further provided to solidly lock the workpieces on the spacing blocks.

In accordance with the invention method, a workpiece is engaged over the elastomeric ring in sealing relationship therewith and air is evacuated from the space below the workpiece by means of a hollow suction needle transfixed through the ring body and connected to a suitable vacuum pump member. As air is removed atmospheric pressure forces the workpiece downwardly against the ring compressing it until the workpiece bottoms on the spacing block means where it may be solidly held as long as vacuum forces are exerted.

In one preferred embodiment of the invention, I may further provide novel control valve means located in the workpiece base for controlling the application of vacuum pumping forces in a more efficient manner. An arrangement of this preferred type is illustrated in FIGURES 1 to 4 and 6 wherein numeral 2 denotes a base member which preferably consists of a material such as steel whose upper side is formed with a plane surface.

In combination with the base 2, I provide adjustable spacing block means. The spacing block means may consist of a plurality of blocks of uniform thickness, designed to be adjustably positioned at the upper side of the base 2 and solidly locked into place to define an enclosure of some desired shape. One of these blocks is indicated at the upper side of FIGURE 1 and is denoted by numeral 4. This block is adapted to be secured in a desired position on the base by means of lateral spacing clamps 6 and 8 which are held by clamping screw members 10 and 12 located through elongated slots 8a and 6a and threaded into threaded openings as 14 in the base 2 below the slots. The lateral spacing clamp presents a vertical abutment surface against which an edge of a workpiece may be secured.

Similarly, a second spacing block member 16 is held by clamping devices 18 and 20 by screws as 22 in holes as 24. It will be observed that by utilizing lateral spacing clamps 18 and 20 of different lengths and by forming these members with elongated slots 18a and 20a, the blocks may be arranged in various positions of angularity with respect to one another to define an enclosure whose shape corresponds to but is slightly smaller than the shape of a workpiece to be supported.

With the spacing blocks and clamping devices arranged as described, it will be apparent that a workpiece W may readily be positioned with its two bottom edges resting on spacing block members 4 and 16, and its two opposite side edges lying against the ends of the lateral spacer members 6, 8, 18 and 20 as illustrated. When thus positioned the workpiece W may be further secured against the blocks 4 and 16 and spacer clamps 18 and 20 by means of another holding block 30. Block 30 is adjustable in a part 32 by means of adjustment screws 34 and 36 and is of a thickness such that it may engage against an edge of the workpiece as may be more clearly seen from an inspection of FIGURE 2 to thereby jam the workpiece W into a solidly locked position. The member 30 may, if desired, be formed with a key portion 30a which is slidable in the part 32.

Within the enclosure defined by the spacing blocks 4 and 16, together with holding block 30, I locate an elastomeric endless sealing ring member 40 which is made with a toric section whose width dimension is substantially greater than the thickness of the spacing blocks 4 and 16 and whose over-all circumference is chosen such that it may be fitted into and substantially fill the enclosure comprised by members 4, 16 and 30 as suggested in dotted lines in FIGURE 1.

It is pointed out that the ring member 40 may take the configuration of any enclosure irrespective of its irregularity characteristics as dictated by the shape of a workpiece to be held. It will also be understood that the elastomeric sealing ring is intended to be representative of any one of a plurality of such endless ring bodies supplied as accessories to the chuck apparatus and whose circumferential lengths may occur in graduated sizes so that a wide range of sizes of irregularly shaped workpieces may be accommodated by a simple trial and error basis.

When the ring 40 has been placed within the enclosure as described, it will extend appreciably above the top surfaces of the spacing blocks as has been illustrated in FIGURE 3 wherein the ring body in the section is shown in abutted relationship to the spacing block 16. As a result of this the workpiece W, as shown in FIGURE 3, is initially received in spaced relation to the spacing blocks 4 and 16 and there is defined a sealed volume of air which can be evacuated by suitable vacuum pump apparatus.

In accordance with one preferred method of the invention for evacuating air, I eliminate the use of conventional section ducts in the base and in place of such ducts I provide a hollow suction needle S which is of a shape and size that it may be sealably transfixed through the toric section of the sealing ring 40 at some convenient point between the spacing and holding blocks as shown, for example, in FIGURES 1 and 3.

Attached to the suction needle S is a flexible conduit 44 which may, if desired, be connected directly to a vacuum pump. In the preferred arrangement shown in FIGURE 1, I may connect the conduit 44 to the pump through a special multi-valve arrangement which is built into the base member 2 as shown at the lower left hand side of FIGURE 1.

The multi-valve arrangement controls a plurality of suction outlets as 50, 52, 54 and 56 which are formed in the base 2 and which extend transversely inwardly as indicated in FIGURE 1. The outer ends of these outlets are threaded as shown. Communicating with these suction outlets 50, 52, 54 and 56 are respective air ducts 70, 68, 66 and 64 which extend at right angles to the suction outlets and are also formed with threaded outer ends as shown in FIGURE 1. Also communicating with suction outlet 56 is another air duct 62.

The threaded ends of ducts 70, 68, 66 and 64 are adapted to receive one or more conduit fittings as illustrated by the conduit fitting 65 attached at the end of the flexible conduit 44 above described. Similarly, the threaded end of duct 62 is adapted to receive conduit fittings as illustrated by the conduit fitting 72. A suction conduit member 70 connects fitting 72 to a vacuum pump P supported in close proximity to the base 2 at some convenient point.

The ducts 50, 52, 54 and 56 are normally closed by special control valve members which are generally indicated by reference characters 55, 55a, 55b, 55c as illustrated at the left hand side of FIGURE 1. Each of these control valve structures may be individually open and closed to provide for passage of evacuated air into the ducts 62, 64, 68 and 70 and thence out through the duct 62 to the vacuum pump P.

In FIGURE 6 the control valve structure of control valve 55 is shown in greater detail and includes an outer casing member C of cylindrical shape which is internally threaded at its inner end to receive a valve body V of the type commonly employed, for example, in pneumatic tires. The casing C has an inner end E solidly held against a sealing ring R1 received by a shouldered part T of the base 2. At its opposite end the casing C is sealably secured by a sealing ring R2 against which is adjustably threaded an adjustment set screw A of the type having an internally recessed head to take a hexagonally shaped wrench.

Closely adjacent to the set screw A and threaded into the casing C is an adjustable valve actuator 80 consisting of a cylindrical member around which is mounted a sealing ring R3. At the inner end of the cylindrical member is a valve contacting stud 82.

Arranged in axial alignment with the valve containing stud 82 is a valve stem element 84 forming part of a spring-held plunger of the valve part V threaded into the casing as shown. The arrangement of parts is such that the valve stem may be engaged by advancing the stud 82 in the casing and the spring-held plunger of the valve is then opened to form a passageway through which air entering the duct 64 may pass through the valve body 55 and out through the duct 62 to the vacuum pump.

It will be observed that the duct 62 extends inwardly to intersect each of the suction outlets 56, 54, 52 and 50 and each of the control valve members 55, 55a, 55b and 55c are formed at either side thereof with transversely disposed air ports which communication with the duct 62 on two sides and which are indicated by reference characters 53, 53a, 53b and 53c. By means of this arrangement flow of air through any one of the ducts 50, 52, 54 and 56 may be selectively controlled by the valve members 55, 55a, 55b and 55c as desired. It will also be apparent that once a desired vacuum has been exerted in one or more of the conduit systems the control valve means may be closed to hold the vacuum thus exerted. It is contemplated that a plurality of workpieces of different sizes and shapes may thus be set up and held on a base member to greatly increase the efficiency of the apparatus and the amount of work which can be done with with the vacuum pump.

In a typical holding operation a workpiece is selected and spacing blocks are mounted on the base and clamped in a position to provide a supporting enclosure which generally corresponds to the shape of the workpiece. The endless sealing ring is then installed in the enclosure. Opposite edges of the workpiece are then clamped into a solidly secured position and the hollow suction needle S is forced through the sealing ring member. At this point the control valve member 55 is adjusted to turn its threaded outer end into the base and engage the stud 82 against the valve stem 84. This opens the valve and the vacuum pump is then started and air is exhausted from the space below the workpiece. Thereafter, if desired, the control valve member 55 may be threaded out to allow the valve stem to close and the vacuum may be held. This operation may be repeated as desired for other workpiece setups.

I may also desire to provide additional spacing block members within the enclosure defined by the members 4 and 16. For example, I may in dealing with a machine tool operation on a workpiece of very thin size find it necessary to support the central portions of the workpiece against deflection. This can be accomplished by means of inner blocks shown in dotted lines in FIGURE 1 and indicated by the reference characters Y and Z.

In FIGURE 5, I have illustrated a modified form of vacuum chuck in which I provide a magnetizable base 90. The base 90 is provided with some conventional form of electromagnet means. In accordance with the invention I employ with this magnetizable baes ferrous metal type blocks as 92, 94, etc. These ferrous metal type blocks are used as spacing members in the same manner already described other than that they are held by magnets in any desired position without the need for using clamping members and the same type of vacuum pump equipment may be employed to evacuate air. The advantage realized is that a non-ferrous type workpiece may thus be held on a magnet type chuck on the spacing blocks 92 and 94 by the vacuum method of the invention.

While I have shown and described preferred embodiments of the invention, it will be understood that various other changes and modifications may be resorted to within the scope of the appended claims.

I claim:

1. A vacuum chuck apparatus comprising a base, spacing block means adjustably mounted on the base, an endless elastomeric ring arranged on the base in abutting relationship to the spacing block means, and means for evacuating air through the endless ring member.

2. A vacuum chuck apparatus for rigidly securing a workpiece in a position to undergo a machine tool operation, said chuck apparatus including a base, spacing blocks of predetermined uniform thickness adjustably secured on the base to define an enclosure generally corresponding to the shape of the workpiece, an elastomeric endless ring member arranged within the enclosure in abutting relationship to the spacing blocks and extending upwardly above the spacing block means a small distance so as to receive said workpiece and support it in spaced relation to the spacing block means, and suction means for removing air from the space occurring below the workpiece whereby forces of atmospheric pressure may be exerted to compress the elastomeric ring member downwardly and to bottom the workpiece on the spacing block means.

3. A structure according to claim 2 in which the suction means includes a vacuum pump, a tubular conduit and a hollow suction needle transfixed through the elastomeric ring member in sealing relationship therewith.

4. A structure according to claim 3 in which the said base includes valve means connected to the said tubular conduit and arranged for selectively opening and closing pasasgeways between the said vacuum pump and the hollow suction needle.

5. A structure according to claim 4 including clamping means for securing the workpiece in a desired position on the spacing blocks.

6. A structure acording to claim 1 in which the said base is magnetizable.

References Cited by the Examiner
UNITED STATES PATENTS

| | | | |
|---|---|---|---|
| 2,730,370 | 1/1956 | Brewster | 279—3 |
| 2,799,205 | 7/1957 | Bacsik | 248—363 |
| 3,134,208 | 5/1964 | Richmond | 269—21 X |

ROBERT C. RIORDON, *Primary Examiner.*

J. McKEOWN, *Assistant Examiner.*